(12) United States Patent
Lin et al.

(10) Patent No.: US 12,536,357 B2
(45) Date of Patent: Jan. 27, 2026

(54) SYSTEMS AND METHODS FOR MODELING VIA DEFECT

(71) Applicant: Taiwan Semiconductor Manufacturing Company, Ltd., Hsinchu (TW)

(72) Inventors: Cheng-Yi Lin, Hsinchu (TW); Tsung-Yang Hung, Zhubei (TW); Ankita Patidar, San Jose, CA (US); Ming-Yih Wang, Hsinchu (TW); Sandeep Kumar Goel, Dublin, CA (US)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 1055 days.

(21) Appl. No.: 17/572,597

(22) Filed: Jan. 10, 2022

(65) Prior Publication Data
US 2023/0019641 A1    Jan. 19, 2023

Related U.S. Application Data

(60) Provisional application No. 63/203,243, filed on Jul. 14, 2021.

(51) Int. Cl.
*G06F 30/367* (2020.01)
*G06F 30/392* (2020.01)
*G06F 119/06* (2020.01)

(52) U.S. Cl.
CPC ......... *G06F 30/367* (2020.01); *G06F 30/392* (2020.01); *G06F 2119/06* (2020.01)

(58) Field of Classification Search
CPC .. G06F 30/367; G06F 30/392; G06F 2119/06; G06F 30/398; G06F 30/3953; G06F 30/394; H10D 89/10
See application file for complete search history.

(56) References Cited

U.S. PATENT DOCUMENTS

2010/0229061 A1*  9/2010  Hapke ............ G01R 31/318342
                                                  714/740
2014/0253541 A1  9/2014  Schmidt
(Continued)

FOREIGN PATENT DOCUMENTS

CN          112668264 A       4/2021
KR     10-2015-0110279 A     10/2015
(Continued)

*Primary Examiner* — Jack Chiang
*Assistant Examiner* — Anwer Ahmed Alawdi
(74) *Attorney, Agent, or Firm* — Finnegan, Henderson, Farabow, Garrett & Dunner, L.L.P.

(57) ABSTRACT

A method includes acquiring a design layout of a standard cell, extracting feature information of one or more vias in the standard cell from the design layout, performing a circuit simulation to obtain first simulation outputs of the standard cell for input patterns by applying a first abnormal resistance value as a parasitic resistance value of a first via among the one or more vias, the first abnormal resistance value being different from a nominal parasitic resistance value of the first via, determining whether the first simulation outputs match corresponding expected outputs of the standard cell for the input patterns, and in response to one or more simulation outputs among the first simulation outputs not matching the corresponding expected outputs, recording one or more defect types for the first via having the first abnormal resistance value along with corresponding input patterns and corresponding simulation outputs.

20 Claims, 11 Drawing Sheets

(56) References Cited

U.S. PATENT DOCUMENTS

2017/0052861 A1 2/2017 Schuermyer et al.
2020/0072901 A1 3/2020 Goel et al.
2021/0407614 A1 12/2021 Patidar et al.

FOREIGN PATENT DOCUMENTS

KR  10-2019-0135550 A  12/2019
TW       202001231 A   1/2020
TW         I709903 B  11/2020

* cited by examiner

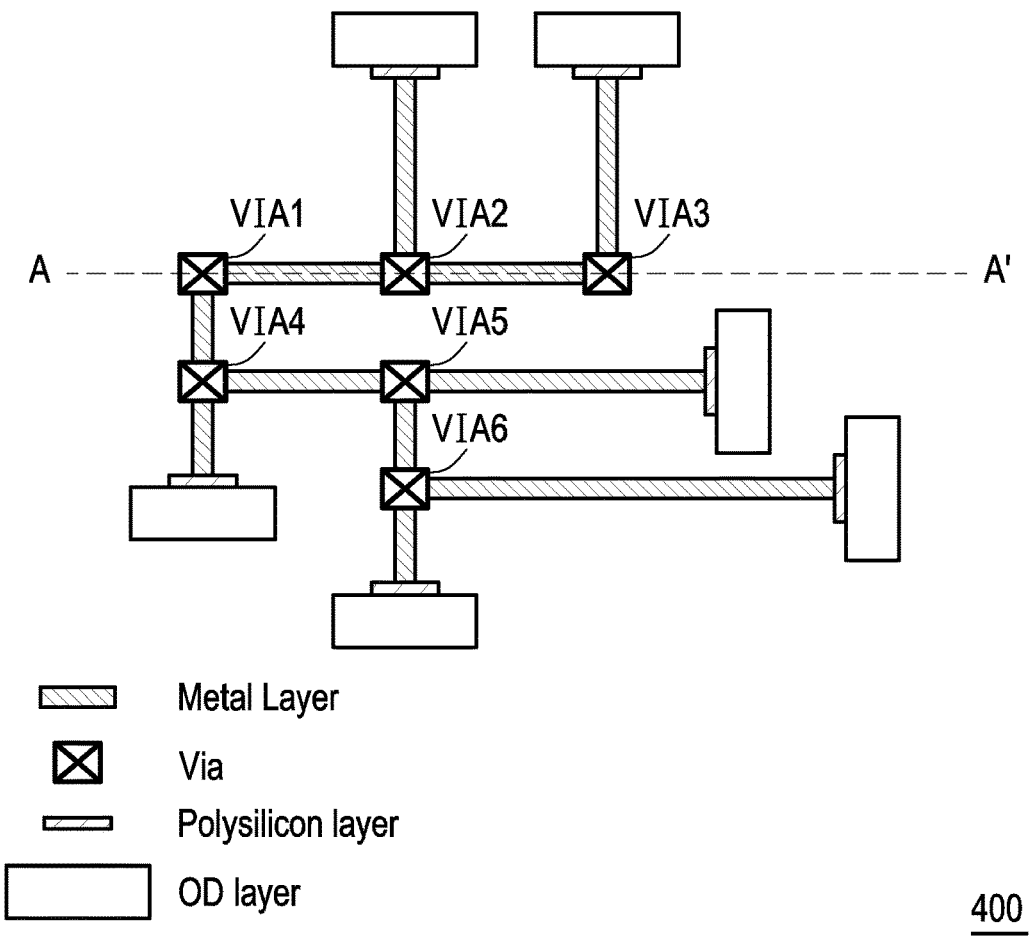
FIG. 4A
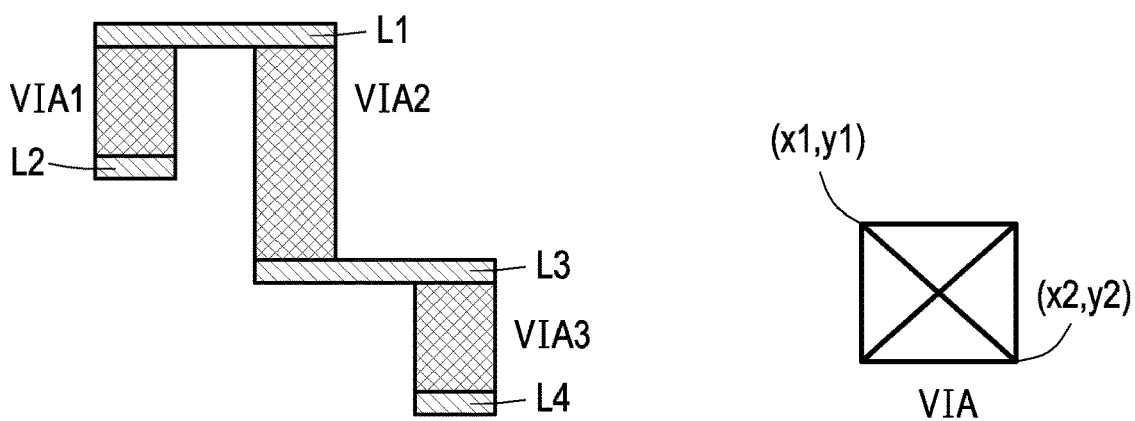
FIG. 4B
FIG. 4C

| VIA NO.\Feature | Layer | Location | Parasitic Resistance Value |
|---|---|---|---|
| VIA1 | L1,L2 | (x1_1,y1_1,x2_1,y2_1) | R1 |
| VIA2 | L1,L3 | (x1_2,y1_2,x2_2,y2_2) | R2 |
| VIA3 | L3,L4 | (x1_3,y1_3,x2_3,y2_3) | R3 |

| Defect Type | Abnormal Resistance | Input Pattern | Expected Output | Simulation Output |
|---|---|---|---|---|
| D11 | 10 | 00, 01, 10, 11 | 0, 0, 0, 1 | 0, 0, 0, 1 |
| D12 | 100 | 00, 01, 10, 11 | 0, 0, 0, 1 | 0, 0, 0, 1 |
| D13 | 1,000 | 00, 01, 10, 11 | 0, 0, [0,] 1 | 0, 0, [1,] 1 |
| D14 | 10,000 | 00, 01, 10, 11 | 0, 0, [0,] 1 | 0, 0, [1,] 1 |
| D15 | 100,000 | 00, 01, 10, 11 | 0, 0, [0,] 1 | 0, 0, [1,] 1 |

620

| VIA NO. | Layer | Location | Defect Type | Abnormal Resistance | Detection Pattern |
|---|---|---|---|---|---|
| VIA1 | L1,L2 | (x1_1,y1_1,x2_1,y2_1) | D13 | 1,000 | 10 |
| VIA1 | L1,L2 | (x1_1,y1_1,x2_1,y2_1) | D14 | 10,000 | 10 |
| VIA1 | L1,L2 | (x1_1,y1_1,x2_1,y2_1) | D15 | 100,000 | 10 |
| VIA2 | L1,L3 | (x1_2,y1_2,x2_2,y2_2) | D23 | 1,000 | 00,01 |

| Pin# | TP# | Expected Output | Test Output | Defect Candidate |
|---|---|---|---|---|
| O1 | 1 | 0 | 1 | VIA1 in 110<br>VIA1 in 120 |
| O1 | 2 | 1 | 0 | VIA1 in 110<br>VIA2 in 120 |

800

SYSTEMS AND METHODS FOR MODELING VIA DEFECT

REFERENCE TO RELATED APPLICATION

This application claims the benefit of U.S. Provisional Application No. 63/203,243, filed on Jul. 14, 2021, entitled "METHOD AND SYSTEM FOR DETECTING DEFECTS IN A SEMICONDUCTOR DEVICE VIA CONDUCTIVE CONTACT," the entirety of which is incorporated by reference herein.

BACKGROUND

Semiconductor circuits may include various front-end-of-line (FEOL) layers and various middle-end-of-line (MEOL) and back-end-of-line (BEOL) layers. FEOL layers can comprise devices such as transistors, capacitors, resistors, etc., and MEOL/BEOL layers can comprise metal layer(s) and via(s) for interconnecting individual devices or cells of FEOL layers on the wafer. As logic designs in integrated circuits (ICs) become larger and more complex, the number of MEOL/FEOL layers also keeps increasing. Therefore, more sophisticated testing for MEOL/FEOL layers are needed to ensure fault-free performance of the resulting ICs.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 4A illustrates a simplified standard cell layout design, in accordance with some embodiments of the present disclosure.

FIG. 4B illustrates a cross-sectional view along a line A-A' of FIG. 4A, in accordance with some embodiments of the present disclosure.

FIG. 4C illustrates example location information of a via, in accordance with some embodiments of the present disclosure.

FIG. 5 is an example via feature table, in accordance with some embodiments of the present disclosure.

FIG. 6D is an example defect model table, in accordance with some embodiments of the present disclosure.

DETAILED DESCRIPTION

Figure 1A:
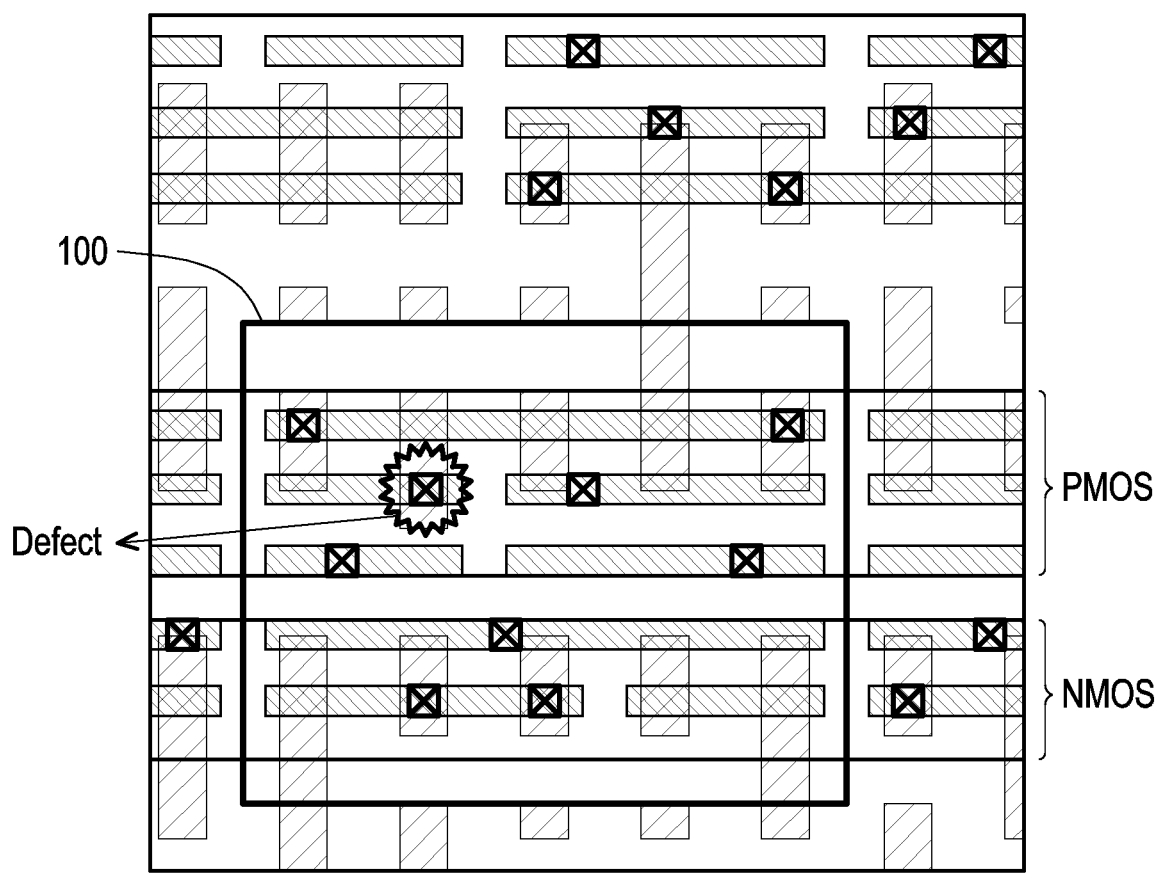
FIG. 1A illustrates a layout diagram of a portion of a circuit, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In this document, the term "coupled" may also be termed as "electrically coupled", and the term "connected" may be termed as "electrically connected." "Coupled" and "connected" may also be used to indicate that two or more elements cooperate or interact with each other.

Semiconductor circuits may include various front-end-of-line (FEOL) layers and various middle-end-of-line (MEOL) and back-end-of-line (BEOL) layers. FEOL layers can comprise devices such as transistors, capacitors, resistors, etc., and MEOL/BEOL layers can comprise metal layer(s) and via(s) for interconnecting individual devices or cells of FEOL layers on a wafer. As logic designs in integrated circuits (ICs) become larger and more complex, the number of MEOL/FEOL layers also keeps increasing. Therefore, more sophisticated testing for MEOL/FEOL layers are needed to ensure fault-free performance of the resulting ICs. However, it is difficult to identify defect(s) and defect location(s) in MEOL/BEOL layers with conventional physical failure analysis, at least partially because defect(s) in MEOL/BEOL layers do not create hot spots of electron hole combinations.

Figure 1B:
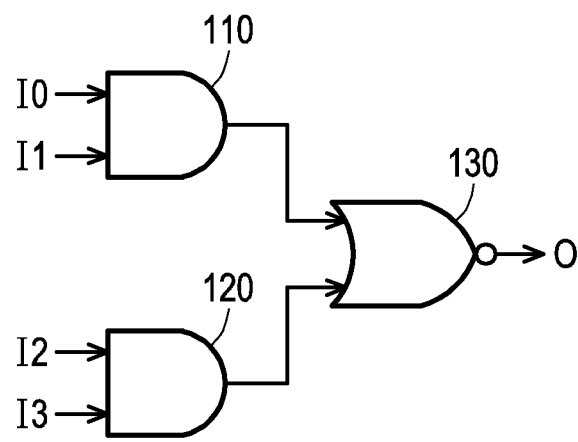
FIG. 1B illustrates a circuit diagram of a portion of a circuit, in accordance with some embodiments of the present disclosure.

FIG. 1A illustrates a layout diagram of a portion of a circuit, in accordance with some embodiments of the present disclosure. In FIG. 1A, NMOS (N-type metal-oxide-semiconductor) devices and PMOS (P-type metal-oxide-semiconductor) devices correspond to devices of FEOL layers. As shown in FIG. 1A, the NMOS and PMOS devices are interconnected with various metal layers and vias. In some embodiments, a semiconductor circuit may comprise an array of cells each including logic circuit(s). In FIG. 1A, a portion 100 of a circuit can correspond to one cell of the circuit. FIG. 1B illustrates a circuit diagram of cell 100, which is provided as an example for illustration purposes. As shown in FIG. 1B, cell 100 in FIG. 1A includes two AND gates 110 and 120 and one NOR gate 130.

In order to detect defect(s) in metal layers and vias of a circuit (e.g., cell 100 of FIG. 1B), the circuit manufactured on a wafer can generally be tested by applying test inputs (e.g., input bits 10 to 13 of FIG. 1B) to the circuit and observing an output(s) (e.g., output O of FIG. 1B) of the circuit. However, many defects that are located within cell 100 may lead to a same output value O, and therefore identifying a defect location or a root cause of a defect can be very challenging. Moreover, as shown in FIG. 1A, a metal layer in a semiconductor circuit may span a large area even beyond a cell boundary, which leads to a defect boundary being very vague. Accordingly, modeling metal layer(s) or metal segments of a circuit may not be effective to identify or specify a defect(s) or a defect location(s) in a circuit. To improve a defect diagnosis and isolation process, providing an effective technique for modeling MEOL/BEOL defect(s) is desired.

As shown in FIG. 1A, the number of vias in a circuit cell is finite although the number of vias continues to increase. Further, a defect(s) of a metal segment(s) associated with a via can appear as a defect(s) of the via. Some embodiments herein provide modeling MEOL/BEOL defect(s) based on vias without estimating a metal line layout polygon. A via defect is generally a high resistance defect rather than a hard defect such as an electrical disconnection, which causes a very short timing effect on a circuit and thus makes it difficult to diagnose and isolate such defect(s).

Figure 2A:
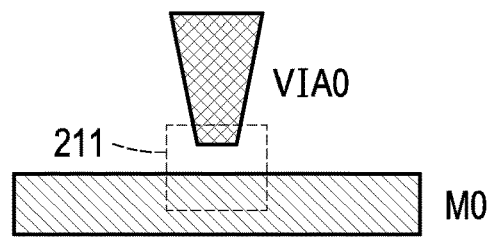
FIGS. 2A-2C illustrate example via defects, in accordance with some embodiments of the present disclosure.
Figure 2B:
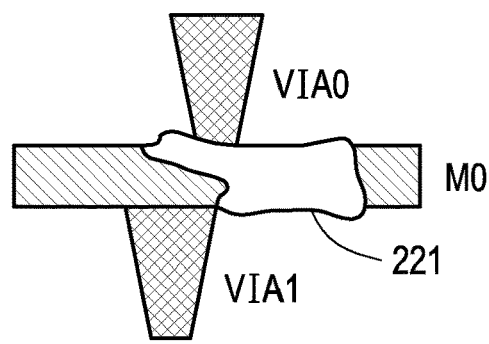
Figure 2C:
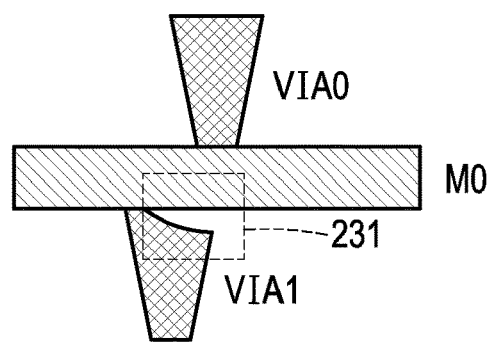

FIGS. 2A-2C illustrate example via defects, in accordance with some embodiments of the present disclosure. FIG. 2A illustrates an example 210 of a via defect 211 caused by under etching where a first via VIA0 is connected to a metal layer M0. Although first via VIA0 is not fully connected to metal layer M0 due to the under etching, first via VIA0 can show high electrical resistance rather than electrical disconnection from metal layer M0 due to a very short gap therebetween. FIG. 2B illustrates an example 220 of a via defect caused by an abnormality of metal layer M0. For example, an extra piece 221 of a different material from that of metal layer M0 is included in metal layer M0. Such a defect of metal layer M0 can appear as a defect on first via VIA0 to have high electrical resistance when electrical conductivity of the material of extra piece 221 is lower than that of metal layer M0. FIG. 2C illustrates an example 230 of a via defect 231 caused by a partial loss of a second via VIA1. For example, a metal material is not fully filled in second via VIA1. Second via VIA1 can show higher electrical resistance than nominal resistance.

As discussed, vias are generally a common source of serial resistance in a standard cell and therefore defective vias are mostly highly resistive defects. Some embodiments of the present disclosure can provide a method for modeling MEOL/BEOL defect(s) based on via(s) of a circuit. According to some embodiments of the present disclosure, via defect(s) can be modeled as an abnormal resistance defect or highly resistive defect.

Figure 3:
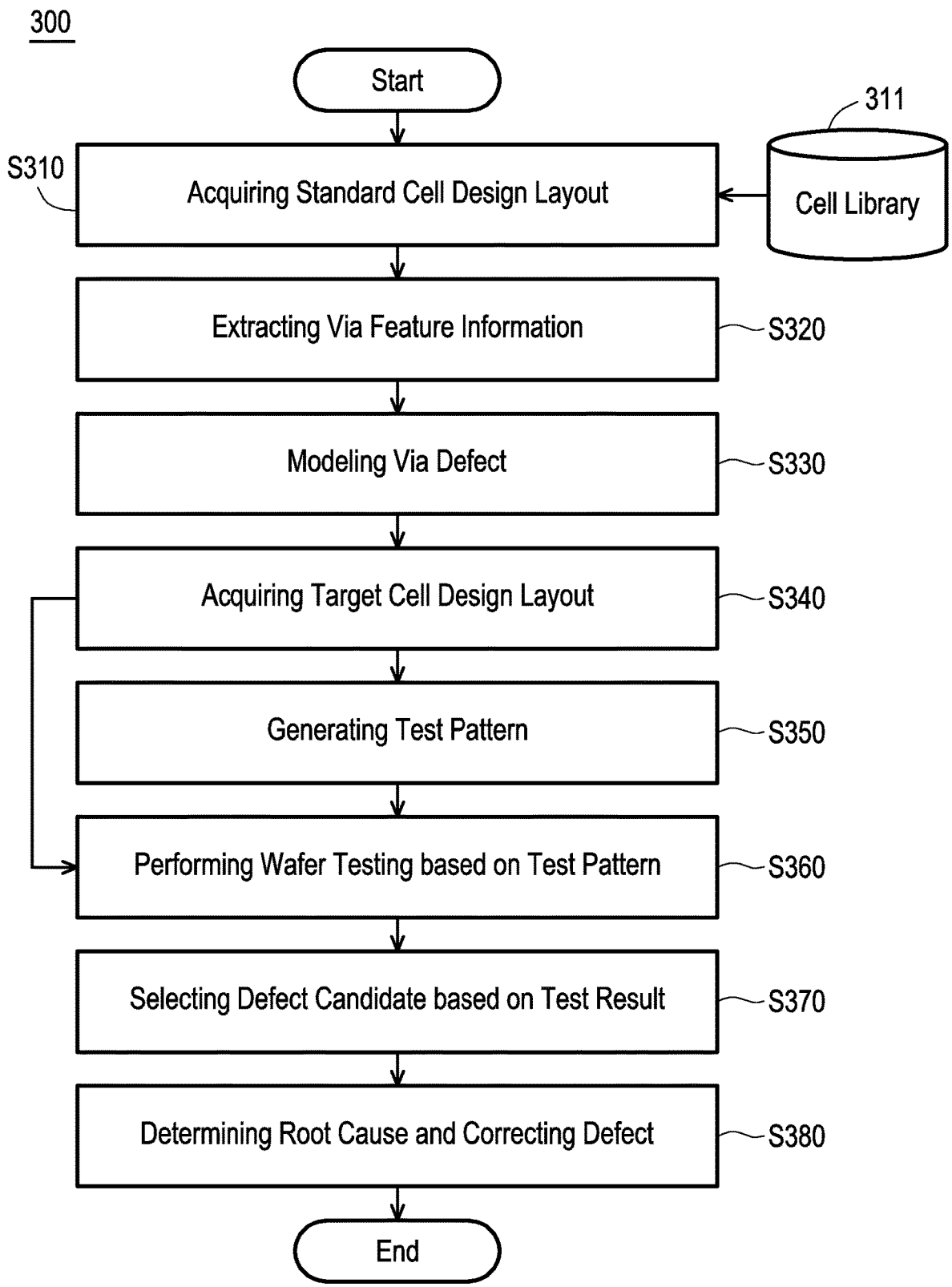
FIG. 3 is a flowchart illustrating a method for modeling and correcting a via defect, in accordance with some embodiments of the present disclosure.

FIG. 3 is a flowchart illustrating a method 300 for modeling and correcting a via defect, in accordance with some embodiments of the present disclosure. According to some embodiments of the present disclosure, at least part of steps in method 300 can be implemented using a computing device, for example, a computing device illustrated in FIG. 9.

According to some embodiments of the present disclosure, in step S310, a standard cell design layout is acquired. In some embodiments, the standard cell design layout can be received from a cell library 311. Cell library 311 can be storage for design layouts for standard cells of circuits. In some embodiments, a standard cell design layout can be in a Graphic Database system (GDS) format, Graphic Database System II (GDS II) format, an Open Artwork system Interchange Standard (OASIS) format, etc. In some embodiments, a standard cell can be a group of transistor and interconnect structures that provides a Boolean logic function such as AND, OR, NOR, XOR, XNOR, inverters, etc. or a storage function such as a flip-flop or latch. Some simple cells can be direct representations of the elemental NAND, NOR, and XOR Boolean function, although other cells of much greater complexity are commonly used.

FIG. 4A illustrates a simplified standard cell layout design, in accordance with some embodiments of the present disclosure. A layout design of a standard cell 400 shown in FIG. 4A is a simplified layout design corresponding to an AND gate, which is an example provided for illustration purposes. As shown in FIG. 4A, the layout design of standard cell 400 includes multiple vias such as VIA1 to VIA6 and multiple metal segments indicated as a metal layer. In FIG. 4A, an OD layer represents an "oxide-definition (OD) region" that is an active region for a transistor, i.e., the area where a source, a drain, and a channel under a gate of the transistor are formed. In FIG. 4A, a polysilicon layer can be provided to provide electrical connectivity between an OD layer and a metal layer.

Referring back to FIG. 3, in step S320, via information of a standard cell can be extracted. In some embodiments, layout features of standard cell 400 can be extracted to extract via information of standard cell 400. In some embodiments, a netlist describing connectivity of various electronic components of standard cell 400 can be extracted. For example, a netlist can include a list of electronic components in standard cell 400 and a list of nodes the electronic components are connected to. In some embodiments, via information of standard cell 400 can be obtained based on layout features or a netlist of standard cell.

According to some embodiments, via information can include layer information, location information, resistance information, etc. In some embodiments, via(s) in a standard cell can be identified by a node in a standard cell. In some embodiments, a node can be associated with a via, and a via location and a via type can be determined based on node information. For example, as shown in FIG. 4A, a via is positioned where two metal segments intersect. In this example, six vias VIA1 to VIA6 can be identified from standard cell 400.

In some embodiments, layer information of identified via(s) can be extracted from layout features or the netlist of standard cell 400. In some embodiments, layer information of a via can be layer mapping information about which layer a via is connected to. FIG. 4B illustrates a cross-sectional view along a line A-A' of FIG. 4A. As shown in FIG. 4B, a first via VIA1 extends between a first layer L1 and a second layer L2, a second via VIA2 extends between first layer L1 and a third layer L3, and a third via VIA3 extends between third layer L3 and a fourth layer L4. In some embodiments, layer information for first via VIA1 can be layer numbers L1 and L2, layer information for second via VIA2 can be layer numbers L1 and L3, and layer information for third via VIA3 can be layer numbers L3 and L4. In some embodiments, first layer L1 to third layer L3 can be metal layers. While layer mapping of a via according to a metal layer has been explained, it will be appreciated that layer mapping according to a different layering system can also be employed.

In some embodiments, location information of identified via(s) can be extracted from layout features or the netlist of standard cell 400. In some embodiments, location information of a via can be a relative X-Y location of a corresponding via in a standard cell layout. FIG. 4C illustrates example location information of a via, in accordance with some embodiments of the present disclosure. As shown in FIG. 4C, a via can be an area rather than a point. Therefore, location information that can define a location along with an area of a via can be used as location information of the via. In FIG. 4C, x-y coordinates (x1, y1, x2, y2) of a top left corner and a bottom right corner can be used to define a location of a via. It will be appreciated that a different format of location information can be utilized. For example, when an area of a via has a circular shape, location information of a via can be defined as X-Y coordinates of a center of the via and a radius.

In some embodiments, resistance information of identified via(s) can be extracted. In some embodiments, resistance information can be parasitic resistance of identified via(s). In some embodiments, parasitic resistance of a via can be determined based on material information of the via and a PVT (process, voltage, and temperature) operating condition that can be provided by a user. In some embodiments, parasitic resistance determined in this step is referred to as nominal parasitic resistance in this disclosure. Nominal parasitic resistance of a via can be an electrical resistance value that a via can have by its design in normal operation. In the present disclosure, nominal parasitic resistance values for first via VIA1 to third VIA3 can be represented as R1 to R3. It will be appreciated that nominal parasitic resistance values R1 to R3 may be or may not be different from each other.

FIG. 5 is an example via feature table 500, in accordance with some embodiments of the present disclosure. In some embodiments, via feature information can be organized as shown in FIG. 5. As shown in FIG. 5, for each via in a standard cell, layer information, location information, and parasitic resistance information can be extracted and recorded. While FIG. 5 illustrates only three vias VIA1 to VIA3, it will be appreciated that via feature information for all vias in a standard cell can be extracted and organized similarly. While extracting via feature information for one standard cell (e.g., standard cell 400) has been explained, it will be appreciated that extracting via feature information for other standard cells can also be performed in a similar way and via feature information for other standard cells can be recorded in a similar manner. For example, via feature information of one or more standard cells representing OR, NOR, XOR, XNOR, inverter, flip-flop, or latch can also be extracted and recorded.

Referring back to FIG. 3, in step S330, a via defect can be modeled for a standard cell according to some embodiments of the present disclosure. In some embodiments, a via defect can be modeled based on simulation by applying abnormal resistance for a via. In some embodiments, abnormal resistance can be a resistance value of a via that is different from a nominal parasitic resistance value of the via. For example, a resistance value that is different from a nominal parasitic resistance value R1 in FIG. 5 can be applied for first via VIA1. According to some embodiments of the present disclosure, a set of abnormal resistance values for via(s) can be determined based on a nominal parasitic resistance value for a corresponding via. For example, for first via VIA1, one or more abnormal resistance values that are different from nominal parasitic resistance value R1 can be determined. In some embodiments, an abnormal resistance value can be less or greater than a nominal resistance value. In some embodiments, an abnormal resistance value can be a value outside a predetermined margin of error. In some embodiments, the margin of error can be determined, e.g., based on experiments, simulations, system requirements, etc. In some embodiments, an abnormal resistance value for a certain via can be determined based on node and material properties of the corresponding via. For example, vias can have a different margin of error depending on node and material properties of the corresponding via. In the present disclosure, a set of abnormal resistance values can include values 10 ohms, 100 ohms, 1000 ohms, 10,000 ohms, 100,000 ohms, etc., for illustration purposes. In this example, a nominal resistance value for first via VIA1 is assumed to be 50 ohms and the margin of error is set to be +/−10% only for illustration purposes. While some embodiments are described with respect to the set of abnormal resistance values 10 ohms, 100 ohms, 1000 ohms, 10,000 ohms, 100,000 ohms, etc., it will be appreciated that other sets of abnormal resistance values selected outside the margin of error for a certain via can be utilized in the present disclosure. In some embodiments, a different set of abnormal resistance values can be set and utilized for other vias, e.g., second via VIA2 or third via VIA3.

According to some embodiments, for each via, a circuit level simulation can be performed for all input patterns to a standard cell to evaluate the output of the standard cell by changing a parasitic resistance value to a set of abnormal resistance values. In some embodiments, a circuit level simulation can be performed by a simulation software such as SPICE (Simulation Program with Integrated Circuit Emphasis). Modeling a via defect according to some embodiments of the present disclosure will be illustrated in detail in the below.

Figure 6A:
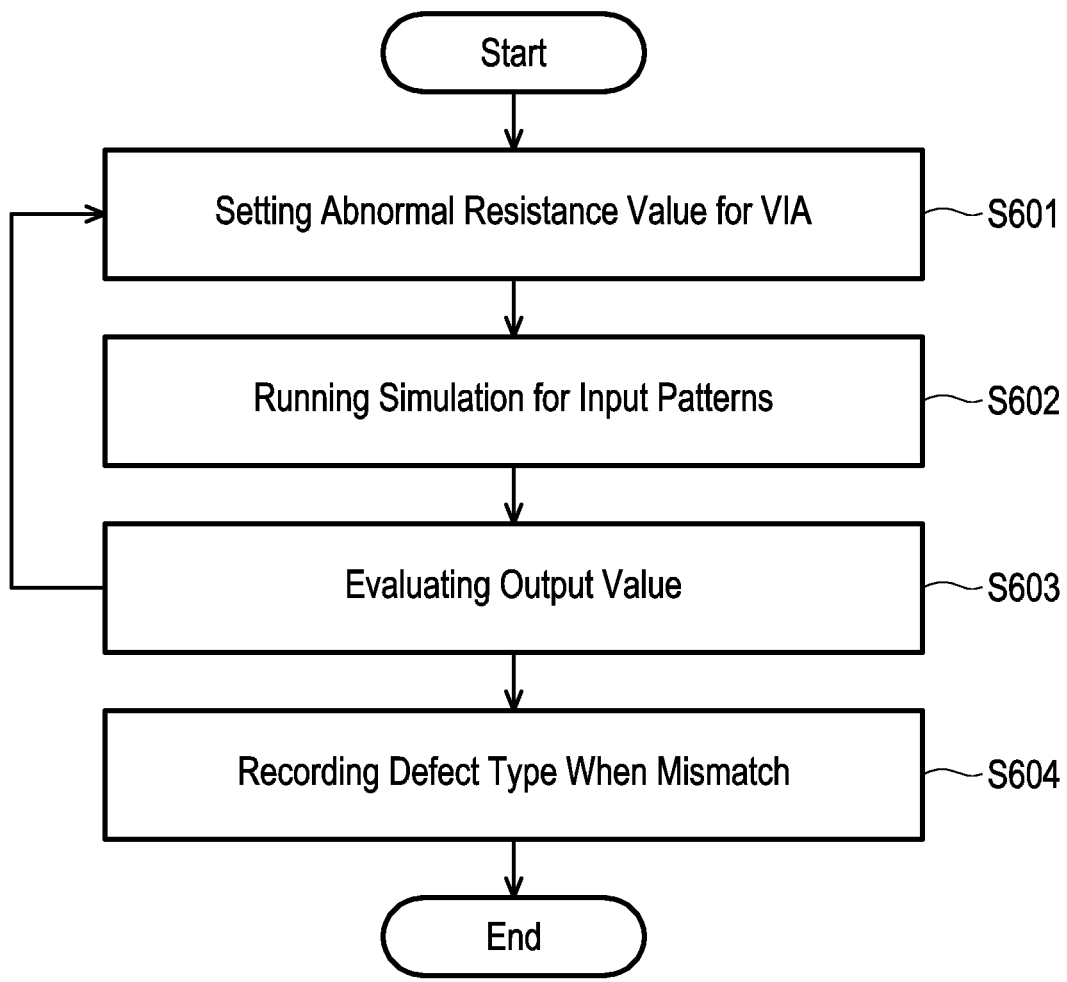
FIG. 6A is a flowchart illustrating a method for modeling a via defect, in accordance with some embodiments of the present disclosure.
Figures 6B, 6C:
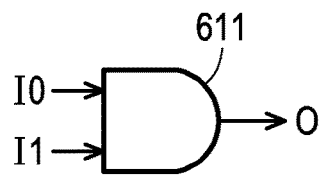
FIG. 6B is a circuit diagram of an example standard cell, in accordance with some embodiments of the present disclosure.
FIG. 6C is an example simulation result table, in accordance with some embodiments of the present disclosure.

FIG. 6A is a flowchart illustrating a method for modeling a via defect, in accordance with some embodiments of the present disclosure. In the present disclosure, a method for modeling a via defect will be explained by referring to a standard cell representing an AND gate. FIG. 6B is a circuit diagram 610 of an example standard cell 400 representing an AND gate. As shown in FIG. 6B, an AND gate 611 receives two inputs I0 and I1 and outputs an output O. In the present disclosure, it will be assumed that AND gate 611 includes first via VIA1 and VIA2 in the cell. In some embodiments, input patterns to AND gate 611 can be 00, 01, 10, and 11.

Referring back to FIG. 6A, for each via, an abnormal resistance value can be set in step S601. According to some embodiments of the present disclosure, an abnormal resistance value can be applied for one via at a time. In some embodiments, when an abnormal resistance value for first via VIA1 is applied for simulation, a nominal parasitic resistance value for second via VIA2 is applied to evaluate an impact of the abnormal resistance value of first via VIA1. Similarly, when an abnormal resistance value for second via VIA2 is applied for simulation, a nominal parasitic resistance value for first via VIA1 is applied. In some embodiments, one abnormal resistance value from a set of abnormal resistance values for first via VIA1 can be set for simulation. In this example, a first abnormal resistance value for first via VIA1 is 10 ohms.

In step S602, for the set abnormal resistance value for a selected via, simulation can be run for all input patterns to standard cell 400. In some embodiments, for all input patterns, i.e., 00, 10, 10, and 11, a circuit level simulation for standard cell 400 is performed to obtain an output value for each input pattern.

In step S603, a simulation output value of standard cell 400 for each input pattern is evaluated. In some embodiments, a simulation output value is evaluated to determine whether the simulation output value matches an expected output value of standard cell 400 for a corresponding input pattern. An expected output is an output value of a standard cell for an input pattern when the standard cell is implemented without a defect. An expected output of standard cell 400 representing an AND gate is value 0 for input pattern 00, an expected output of standard cell 400 is value 0 for input pattern 01, an expected output of standard cell 400 is value 0 for input pattern 10, and an expected output of standard cell 400 is value 1 for input pattern 11. FIG. 6C is an example simulation result table 620, in accordance with some embodiments of the present disclosure. A first row of FIG. 6C illustrates a simulation result when first abnormal resistance value 10 ohms is applied. As shown in FIG. 6C, when first abnormal resistance value 10 ohms is applied, simulation outputs for input patterns match the expected outputs, respectively. Therefore, there is no defect type to record or report.

According to some embodiments of the present disclosure, steps S601 to S603 can be repeated for all abnormal resistance values in a set of abnormal resistance values for first via VIA1. For example, steps S601 to S603 can be performed for abnormal resistance values 100 to 100,000 ohms.

According to some embodiments, step S604 can be performed when a mismatch between an expected output and a simulation output is observed. As shown in FIG. 6C, when third abnormal resistance value 1000 ohms is applied, a simulation output for input pattern 10 is different from an expected output as indicated by a square box. Similarly, when fourth and fifth abnormal resistance values 10,000 ohms and 100,000 ohms are applied, there are mismatches between an expected output and a simulation output for input pattern 10. In some embodiments, when a simulation output deviates from an expected output by a predetermined threshold, it can be determined that there is a mismatch between the simulation output and the expected output.

In step S604, a defect type is recorded when there is a mismatch between a simulation output and an expected output. As shown in FIG. 6C, table 620 lists defect types D11 to D15, for first via VIA1, corresponding to abnormal resistance values to 10 to 100,000 ohms. In some embodiments, when a simulation output does not match an expected out, a corresponding defect type can be reported and/or recorded as a defect model table, which will be explained by referring to FIG. 6D.

FIG. 6D is an example defect model table 630, in accordance with some embodiments of the present disclosure. As shown in FIG. 6D, defect model table 630 can include the defect type (e.g., D13, D14, or D15), a corresponding via identification (e.g., VIA1 or VIA2), corresponding via feature information (e.g., via layer information, via location information, etc.), a corresponding abnormal resistance value, a detection pattern for detecting the corresponding defect type, etc. In some embodiments, each row of defect model table 630 can represent one defect model for a via. In some embodiments, a detection pattern can be an input pattern that caused a mismatch between a simulation output and an expected output. For example, in table 620 of FIG. 6C, a simulation output is different from an expected output for input pattern 10 for defect type D13 in which third abnormal resistance value 1000 ohms is applied for first via VIA1. Therefore, in defect model table 630 of FIG. 6D, a detection pattern for defect type D13 is listed as pattern 10. Similarly, detection patterns for defect types D14 and D15 can be determined to be pattern 10. According to some embodiments of the present disclosure, a detection pattern can be a test pattern to detect a defect associated with a corresponding defect type.

According to some embodiments of the present disclosure, steps S601 to S603 or steps S601 to S604 can be repeated for all other vias in the standard cell. For example, steps S601 to S603 or steps S601 to S604 can be performed for second via VIA2 and other vias in the standard cell. Defect model table 630 of FIG. 6D lists defect type D23 for second via VIA2 along with detection patterns 00 and 01. It will be appreciated that method 600 can be performed for additional standard cell(s) and defect model tables similar to defect model table 630 of FIG. 6D can be established for each standard cell.

Referring back to FIG. 3, in step S340, a target cell design layout is acquired according to some embodiments of the present disclosure. In some embodiments, a target cell design layout can be a design layout of a semiconductor cell to be inspected for a via defect(s). In some embodiments, a target cell design layout can be in a Graphic Database system (GDS) format, Graphic Database System II (GDS II) format, an Open Artwork system Interchange Standard (OASIS) format, etc. In some embodiments, a target cell design layout can be different from a standard cell design layout. In some embodiments, a target cell design layout can be inclusive of one or more standard cells. In the present disclosure, some embodiments of the present disclosure will be explained by referring to cell 100 shown in FIG. 1B as a target cell.

In step S350, a test pattern is generated to detect a via defect(s) in a target cell according to some embodiments of the present disclosure. In some embodiments, a test pattern can be generated based on defect model(s) generated in step S330. In this example, it will be appreciated that it is assumed target cell 100 includes two vias VIA1 and VIA2 in each of first AND gate 110 and second AND gate 120 of target cell 100. As discussed, FIG. 6D illustrates defect model table 630 of a standard cell representing an AND gate. As shown in FIG. 6D, detection pattern 10 can be applied to detect defect type(s) D13 to D15 for first VIA1 in an AND gate standard cell. Similarly, detection patterns 00 and 01 can be applied to detect defect type(s) D23 for second VIA2 in an AND gate standard cell.

According to some embodiments of the present disclosure, in order to detect all defect types listed in defect model table 630 in a target cell, all detection patterns for each defect model can be applied as test patterns. For example, to detect defect types D13, D14, D15, and D23 of first AND gate 110, each of detection patterns 10, 00, and 01 can be applied as inputs I0 and I1. Similarly, to detect defect types D13, D14, D15, and D23 of second AND gate 120, each of detection patterns 10, 00, and 01 can also be applied as inputs I2 and I3. In some embodiments, all possible combinations of detection patterns to detect all possible defect types listed as defect models in defect model table 630 can be determined to be test patterns for a target cell.

Figures 7, 8:
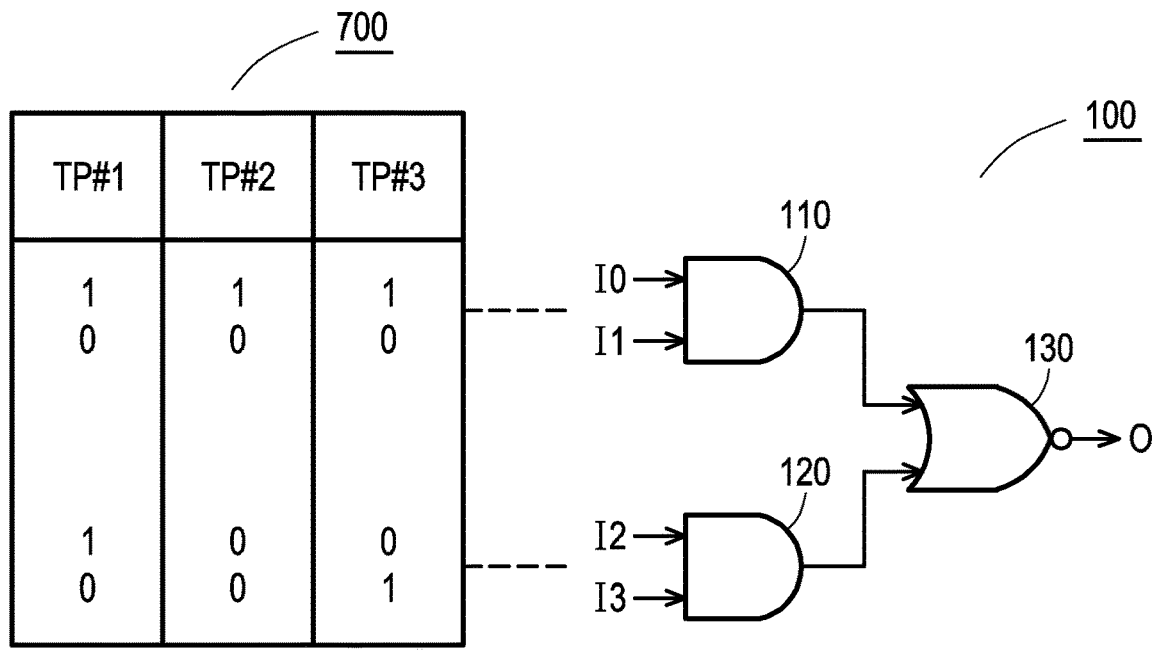
FIG. 7 illustrates example test patterns for an example target cell, in accordance with some embodiments of the present disclosure.
FIG. 8 is an example test result analysis table, in accordance with some embodiments of the present disclosure.

FIG. 7 illustrates example test patterns 700 for an example target cell, in accordance with some embodiments of the present disclosure. As shown in FIG. 7, a first pattern TP #1 can be 1010 to detect defect types D13, D14, and D15 for first via VIA1 in each of first AND gate 110 and second AND gate 120. A second pattern TP #2 can be 1000 to detect defect types D13, D14, and D15 for first via VIA1 in first AND gate 110 and to detect defect type D23 for second via VIA2 in second AND gate 120. A third pattern TP #3 can be 1001 to detect defect types D13, D14, and D15 for first via VIA1 in first AND gate 110 and to detect defect type D23 for second via VIA2 in second AND gate 120. Similarly, other test patterns can be generated by combining detection patterns corresponding to each defect type. For example, fourth to sixth test patterns TP #4 to TP #6 can be 0010, 0000, and 0001, and seventh to ninth test patterns TP #7 to TP #9 can be 0110, 0100, 0101. While generation of test patterns for a target cell is explained with respect to two AND gates and two vias for each AND gate, it will be appreciated that any number of vias and any other type of standard cells may be considered when generating test patterns.

According to some embodiments of the present disclosure, a test pattern(s) for a target cell to detect defect types modeled in step S330 can be generated by a software program such as ATPG (Automatic Test Pattern Generator). In some embodiments, a target cell design layout and a netlist of the target cell can be provided to ATPG. In some embodiments, a defect model table (e.g., defect model table 630 in FIG. 6D) generated in step S330 can be provided to ATPG. In some embodiments, information of all defect types associated with a target cell can be extracted and provided to ATPG. For example, when target cell 100 includes an AND gate standard cell and a NOR gate standard cell, defect type(s) for an AND gate standard cell and defect type(s) for a NOR gate standard cell including detection patterns can be provided to ATPG. Based on the provided information, test patterns for a target cell can be generated by ATPG.

According to some embodiments of the present disclosure, a test pattern generation step can be skipped, as shown in FIG. 3, when a target cell has a design layout of a standard cell. In this example, detection pattern(s) for defect type(s) identified by a detection model table (e.g., defect model table 630 in FIG. 6D) for the corresponding standard cell can be directly used as test pattern(s) for a target cell.

Referring back to FIG. 3, in step S360, a wafer test can be performed based on a generated test pattern(s) according to some embodiments of the present disclosure. In some embodiments, a target cell is tested after a target cell is manufactured on a wafer. In some embodiments, ATE (Automatic Test Equipment) can be utilized to perform tests on a device that is a target cell manufactured on a wafer. According to some embodiments of the present disclosure, a test pattern(s) generated in step S350 can be applied to the device and a test result can be obtained. According to some embodiments of the present disclosure, a test result of the device can be recorded for each input test pattern.

In step S370, a defect candidate(s) can be selected based on test results obtained in step S360 according to some embodiments of the present disclosure. In some embodiments, a test result for an input test pattern can be compared to an expected output of a target cell for the same input pattern. In some embodiments, when there is a mismatch between the test result and the expected output value, the test pattern can be recorded.

FIG. 8 is an example test result analysis table 800, in accordance with some embodiments of the present disclosure. FIG. 8 shows that, for first test pattern TP #1, a test output of a target cell is different from an expected output. For target cell 100 of FIG. 1B, an expected output value for first test pattern TP #1 1010 is 0 while a test output value is 1. In some embodiments, based on the test pattern causing a mismatch, a possible defect candidate(s) can be determined based on defect model table 630 of FIG. 6D. For example, the first two bits 10 in first test pattern TP #1 are to detect defect type(s) D13, D14, and D15 of first via VIA1 in first AND gate 110 and the last two bits 10 are to detect D13, D14, and D15 of first via VIA1 in second AND gate 120. In some embodiments, first via VIA1 in first AND gate 110 and first via VIA1 in second AND gate 120 can be determined to be defect candidates because the test output does not match the expected output for first test pattern TP #1.

Similarly, FIG. 8 shows that, for second test pattern TP #2, a test output of a target cell is different from an expected output. For target cell 100 of FIG. 1B, an expected output value for second test pattern TP #1 1000 is 1 while a test output value is 0. In this example, the first two bits 10 in second test pattern TP #2 are to detect defect type(s) D13, D14, and D15 of first via VIA1 in first AND gate 110 and the last two bits 00 are to detect defect type D23 of second via VIA2 in second AND gate 120, which can be derived from defect model table 630 of FIG. 6D. In this example, first via VIA1 in first AND gate 110 and second via VIA2 in second AND gate 120 can be determined to be defect candidates because the test output does not match the expected output for second test pattern TP #2. Similarly, test result analysis can be performed for each failed test result to determine candidate defect(s) for a corresponding test pattern.

According to some embodiments of the present disclosure, defect candidate(s) identified by test result analysis can be determined to be defect candidate(s) for a target cell for further diagnosis. In some embodiments, all defect candidates listed in the right most column of test result analysis table 800 can be determined to be defect candidate(s) for a target cell. In some embodiments, defect candidate(s) listed in test result analysis table 800 can be sorted according to confidence score. For example, a via showing up most often as a defect candidate in test result analysis table 800 can have the highest confidence score to be a defect. In some embodiments, a certain number of vias among defect candidates listed in test result analysis table 800 can be chosen as defect candidates for a target cell. For example, a certain number of vias having the higher confidence score can be selected as defect candidates for a target cell. In some embodiments, a via that is a common defect source for most of defect types can be chosen to a defect candidate for a target cell for further diagnosis.

Referring back to FIG. 3, a root cause can be determined based on diagnosis of defect candidate(s) selected in step S370, according to some embodiments of the present disclosure. In some embodiments, a defect candidate(s) can be diagnosed to determine whether there is a defect associated with the defect candidate(s). In some embodiments, a defect candidate diagnosis can be performed by a physical failure analysis (PFA) technique that assesses construction quality of electronic devices to verify that the quality meets the specific requirement of the devices. In some embodiments, PFA techniques can include, but are not limited to, micro and nano structure imaging, X-ray analysis, scanning electron microscopes (SEM) analyses, optical microscope analysis, cross-sectional analysis, structural analysis, energy dispersive spectroscopy (EDS) analysis, focus ion beam (FIB) analysis, etc.

According to some embodiments of the present disclosure, a root cause of a defect(s) can be determined based on diagnosis for defect candidate(s) and can be corrected. In some embodiments, a chip design layout for a target cell can be modified to cure the identified root cause. For example, a chip design layout can be changed to minimize or remove via type(s) that cause failure on the chip. In some embodiments, a chip design layout can further be modified to add other types of via(s) to compensate for the minimization or removal of certain via type(s) causing failure. In some embodiments, a cell design for a target cell can be modified to minimize or remove defect susceptible via(s). In some embodiments, a process recipe to implement a target cell on a wafer can be tuned such that robust vias can be made.

Figure 9:
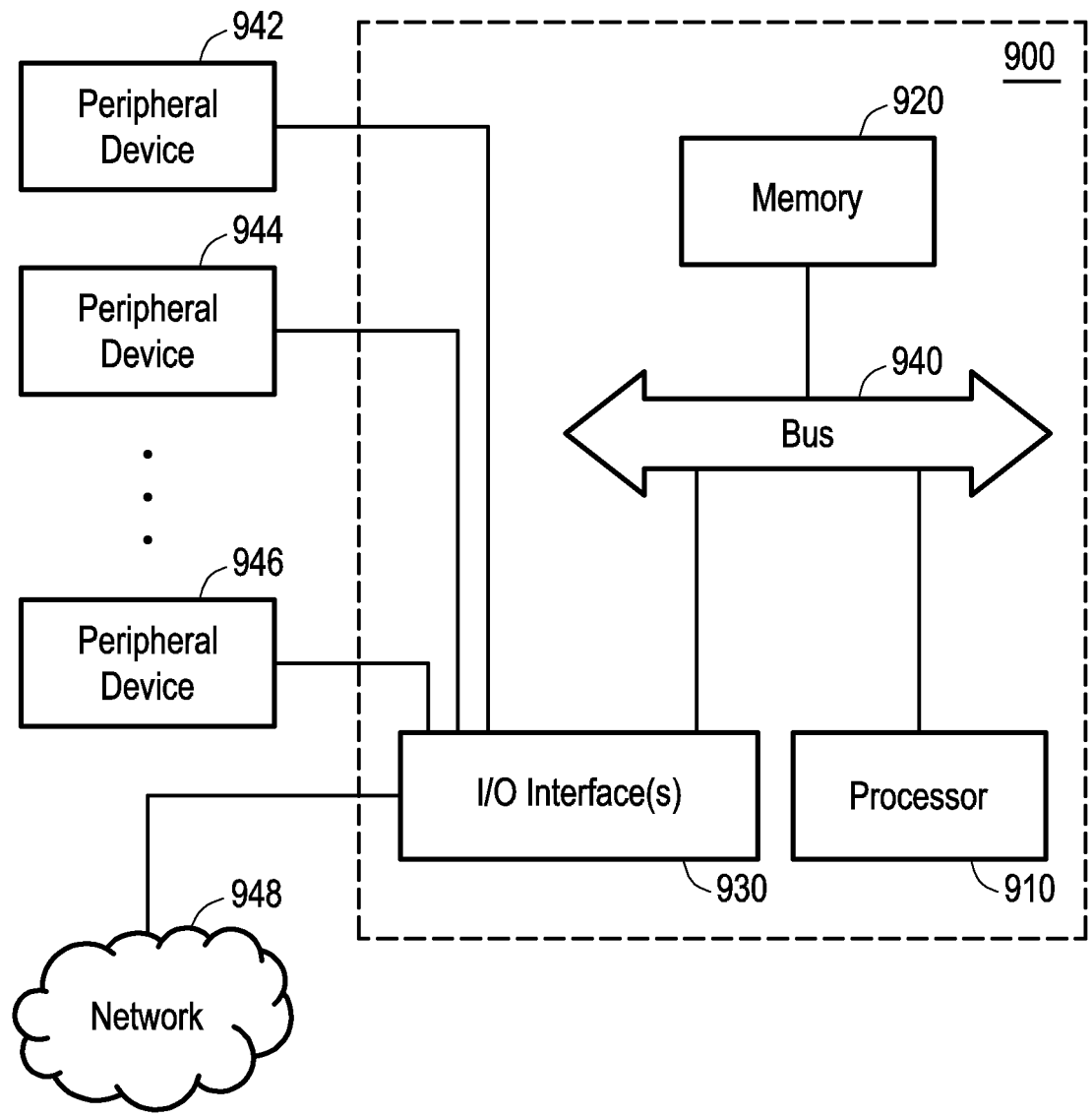
FIG. 9 is an example computing device, in accordance with some embodiments of the present disclosure.

FIG. 9 is an example computing device 900, in accordance with some embodiments of the present disclosure. According to some embodiments of the present disclosure, at least part of steps in method 300 can be implemented using computing device 900 illustrated in FIG. 9. Computing device 900 includes a processor 910, one or more memories 920, Input/output (I/O) interfaces 930, and a bus 940. In some embodiments, processor 910 is communicatively coupled to memory 920 and I/O interfaces 930 via bus 940. In various embodiments, processor 910 can be a central processing unit (CPU), an application specific integrated circuit (ASIC), a multi-processor, a distributed processing system, or other suitable processor. Various circuits or units to implement processor 910 are within the contemplated scope of the present disclosure.

Memory 920 stores one or more program codes for aiding circuit-level simulation of a standard cell, generation of defect model(s) of a standard cell, generation of test pattern(s) for a target cell, test and diagnosis of a device manufactured on a wafer, etc. For example, memory unit(s) 920 can store instructions for one or more programs executable by processor 910 to perform operations.

In some embodiments, memory 920 can be a non-transitory computer readable storage medium encoded with, e.g., storing, a set of executable instructions for performing operations described herein. In some embodiments, the computer readable storage medium is an electronic, magnetic, optical, electromagnetic, infrared, and/or a semiconductor system (or apparatus or device). For example, the computer readable storage medium includes a semiconductor or solid-state memory, a magnetic tape, a removable computer diskette, a random-access memory (RAM), a read-only memory (ROM), a rigid magnetic disk, and/or an optical disk. In one or more embodiments using optical disks, the computer readable storage medium includes a compact disk-read only memory (CD-ROM), a compact disk-read/write (CD-R/W), a digital video disc (DVD), a flash memory, and/or other media, now known or later developed, that are capable of storing code or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

I/O interfaces 930 are configured to receive inputs or commands from various control devices which, for example, are operated by a user. Accordingly, computing device 900 can be controlled with the inputs or commands received by I/O interfaces 930. In some embodiments, I/O interfaces 930 can be communicatively coupled to one or more peripheral devices 942, 944, 946, which can be storage devices, servers, displays (e.g., cathode ray tube (CRT), liquid crystal display (LCD), touch screen, etc.) configured to display the status of the program code execution, or input devices (e.g., keyboard, keypad, mouse, trackball, trackpad, touch screen, cursor direction keys, or the combination thereof) for communicating information and commands to processor 910. In some embodiments, peripheral device 942 is a storage device storing standard cell library 311 and a target cell design layout. Computing device 900 can also transmit data to or communicate with peripheral device(s) or other terminal devices through a network 948, such as a local network, an internet service provider, internet, or any combination thereof.

The above illustrations include exemplary operations, but the operations are not necessarily performed in the order shown. Operations may be added, replaced, changed order, and/or eliminated as appropriate, without departing from the spirit and scope of the present disclosure.

According to some embodiments of the present disclosure, MEOL/BEOL defect(s) can be modeled based on via(s) of a circuit without modeling a conventional metal layer polygon. According to some embodiments of the present disclosure, via defect(s) can be modeled as an abnormal resistance defect or highly resistive defect with respect to standard cell(s). According to some embodiments of the present disclosure, defective vias of a target cell can be identified with high accuracy by comparing wafer level test results with defect models organized in a lookup table. According to some embodiments of the present disclosure, defect types listed as defect models for a standard cell(s) can be detected from a target cell inclusive of the standard cell(s) by generating test patterns for the target cell to detect the defect types. According to some embodiments of the present disclosure, identifying a defect and defect location can be facilitated because a via for which location is well defined and limited is utilized to model the defect. While some embodiments are explained for identifying defect(s) within the cell, it will be appreciated that the present disclosure can be utilized to identify defect(s) outside a cell.

Some embodiments provides a method comprising acquiring a design layout of a standard cell, extracting feature information of one or more vias in the standard cell from the design layout, performing a circuit simulation to obtain first simulation outputs of the standard cell for input patterns by applying a first abnormal resistance value as a parasitic resistance value of a first via among the one or more vias, the first abnormal resistance value being different from a nominal parasitic resistance value of the first via, determining whether the first simulation outputs match corresponding expected outputs of the standard cell for the input patterns, and in response to one or more simulation outputs among the first simulation outputs not matching the corresponding expected outputs, recording one or more defect types for the first via having the first abnormal resistance value along with corresponding input patterns and corresponding simulation outputs.

In some embodiments, a system is also disclosed that includes a processor and one or more memories storing instructions for one or more programs executable by the processor to perform operations. The operations include: acquiring a design layout of a target cell, the target cell comprising a first standard cell including a first via and a second standard cell including a second via, and generating, for the target cell, test patterns that enable a detection of a first defect type recorded for the first standard cell and a second defect type recorded for the second standard cell, the first defect type associated with the first via, a first input pattern, and a first abnormal resistance value that is different from a parasitic resistance value of the first via, the second defect type associated with the second via, a second input pattern, and a second abnormal resistance value that is different from a parasitic resistance value of the second via, wherein the test patterns are generated based on the first input pattern and the second input pattern.

In some embodiments, a non-transitory computer-readable storage medium is also disclosed. The non-transitory computer-readable storage medium stores a set of instructions that are executable by one or more processors of a device to cause the device to perform a method. The method includes: acquiring a design layout of a target cell, the target cell including a standard cell comprising one or more vias, and generating, for the target cell, test patterns that enable a detection of one or more defect types recorded for the standard cell, the one or more defect types including a defect type associated with a selected via among the one or more vias along with an input pattern and an abnormal resistance value that is different from a parasitic resistance value of the selected via, wherein the test patterns are generated based on the input pattern.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
acquiring a design layout of a standard cell;
extracting feature information of one or more vias in the standard cell from the design layout;
performing a circuit simulation to obtain first simulation outputs of the standard cell for input patterns by applying a first abnormal resistance value as a parasitic resistance value of a first via among the one or more vias, the first abnormal resistance value being different from a nominal parasitic resistance value of the first via;
determining whether the first simulation outputs match corresponding expected outputs of the standard cell for the input patterns; and
in response to one or more simulation outputs among the first simulation outputs not matching the corresponding expected outputs, recording one or more defect types for the first via having the first abnormal resistance value along with corresponding input patterns and corresponding simulation outputs,
wherein the one or more defect types are recorded in a table for the first via along with the corresponding input patterns, the first abnormal resistance value, and the corresponding simulation outputs.

2. The method of claim 1, wherein performing the circuit simulation comprises:
performing the circuit simulation while applying a nominal parasitic resistance value for a second via among the one or more vias as a parasitic resistance value of the second via.

3. The method of claim 1, wherein the circuit simulation is a first circuit simulation, the method further comprising:
performing a second circuit simulation to obtain second simulation outputs of the standard cell for the input patterns by applying a second abnormal resistance value as a parasitic resistance value of the first via;
determining whether the second simulation outputs match the corresponding expected outputs of the standard cell for the input patterns; and
in response to one or more simulation outputs among the second simulation outputs not matching the corresponding expected outputs, recording one or more defect types for the first via having the second abnormal resistance value along with corresponding input patterns and corresponding simulation outputs.

4. The method of claim 1, wherein the circuit simulation is a first circuit simulation, the method further comprising:
performing a second circuit simulation to obtain second simulation outputs of the standard cell for the input patterns by applying a second abnormal resistance value as a parasitic resistance value of a second via among the one or more vias;
determining whether the second simulation outputs match the corresponding expected outputs of the standard cell for the input patterns; and
in response to one or more simulation outputs among the second simulation outputs not matching the corresponding expected outputs, recording one or more defect types for the second via having the second abnormal resistance value along with corresponding input patterns and corresponding simulation outputs.

5. The method of claim 1, wherein the feature information comprises one or more of via location information, via layer information, or via nominal parasitic resistance information.

6. The method of claim 1, further comprising:
acquiring a design layout of a target cell, the target cell comprising the standard cell; and
generating test patterns that enable a detection of the recorded one or more defect types from the target cell, the test patterns comprising combinations of the corresponding input patterns.

7. The method of claim 6, further comprising:
testing a device of the target cell manufactured on a wafer based on the test patterns.

8. The method of claim 7, further comprising:
determining the first via to be a defect candidate based on test results, the test patterns, and the recorded one or more defect types along with the corresponding input patterns and the corresponding simulation outputs.

9. A system, comprising:
a processor; and
one or more memories storing instructions for one or more programs executable by the processor to perform operations comprising:

acquiring a design layout of a target cell, the target cell comprising a first standard cell including a first via and a second standard cell including a second via; and generating, for the target cell, test patterns that enable a detection of a first defect type recorded for the first standard cell and a second defect type recorded for the second standard cell, the first defect type associated with the first via, a first input pattern, and a first abnormal resistance value that is different from a parasitic resistance value of the first via, the second defect type associated with the second via, a second input pattern, and a second abnormal resistance value that is different from a parasitic resistance value of the second via, wherein the test patterns are generated based on the first input pattern and the second input pattern, wherein the first defect type is recorded in a table for the first via along with the first input pattern and the first abnormal resistance value.

10. The system of claim 9, wherein the test patterns include combinations of the first input pattern and the second input pattern.

11. The system of claim 9, wherein the operations further include:

acquiring a design layout of the first standard cell;

extracting feature information of the first via from the design layout of the first standard cell;

performing a circuit simulation to obtain a first simulation output of the first standard cell for the first input pattern by applying the first abnormal resistance value as the parasitic resistance value of the first via;

determining whether the first simulation output matches a first expected output of the first standard cell for the first input pattern; and in response to the first simulation output not matching the first expected output, recording the first defect type.

12. The system of claim 11, wherein the first defect type is further recorded in the table for the first via along with the first simulation output.

13. The system of claim 11, wherein the first standard cell includes an additional via and the operations further include:

performing the circuit simulation while applying a nominal parasitic resistance value for the additional via as a parasitic resistance value of the additional via.

14. The system of claim 11, wherein the feature information comprises one or more of via location information, via layer information, or via nominal parasitic resistance information.

15. The system of claim 9, the operations further comprising:

testing a device of the target cell manufactured on a wafer based on the test patterns.

16. The system of claim 15, the operations further comprising:

determining the first via or the second via to be a defect candidate based on test results, the test patterns, and the recorded first and second defect types along with the first and second input patterns.

17. A non-transitory computer-readable storage medium storing a set of instructions that are executable by one or more processors of a device to cause the device to perform a method, the method comprising:

acquiring a design layout of a target cell, the target cell comprising a standard cell including one or more vias; and generating, for the target cell, test patterns that enable a detection of one or more defect types recorded for the standard cell, the one or more defect types including a defect type associated with a selected via among the one or more vias along with an input pattern and an abnormal resistance value that is different from a parasitic resistance value of the selected via, wherein the test patterns are generated based on the input pattern, wherein the defect type is further associated with a simulation output obtained by performing a circuit simulation, and is recorded in a table for the selected via along with the input pattern, the abnormal resistance value, and the simulation output.

18. The non-transitory computer-readable storage medium of claim 17, wherein the simulation output is obtained by performing the circuit simulation by applying the input pattern and the abnormal resistance value and is different from an expected output of the standard cell for the input pattern.

19. The non-transitory computer-readable storage medium of claim 18, wherein the method further comprises:

testing a device of the target cell manufactured on a wafer based on the test patterns.

20. The non-transitory computer-readable storage medium of claim 19, wherein the method further comprises:

determining the selected via to be a defect candidate based on test results, the test patterns, and the one or more defect types along with the corresponding input patterns and the corresponding simulation outputs.

* * * * *